July 26, 1949.   R. H. POSTAL   2,477,348
THERMOELECTRIC APPARATUS
Filed June 1, 1945
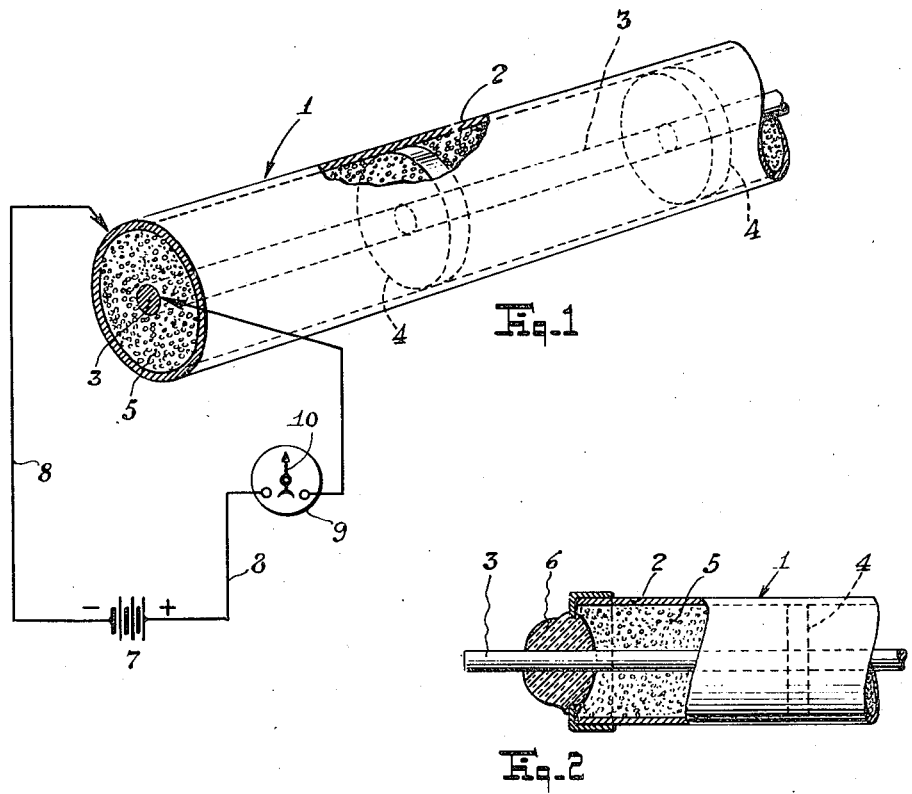
INVENTOR
Robert H. Postal
By Henry Canahan
ATTORNEY Patented July 26, 1949

2,477,348

UNITED STATES PATENT OFFICE 2,477,348

THERMOELECTRIC APPARATUS

Robert H. Postal, New York, N. Y., assignor to Thomas A. Edison, Incorporated, West Orange, N. J., a corporation of New Jersey Application June 1, 1945, Serial No. 597,042

2 Claims. (Cl. 201—63)

This invention relates to thermoelectric control and/or fire-detecting apparatus and more particularly to a novel thermionic device for detecting high ambient temperatures.

It is an object of my invention to provide a novel and improved device of simple and economical construction for passing an electric current, as for alarm or control purposes, upon the device being heated by an incandescent flame.

It is another object to provide a novel current-controlling device which is responsive to temperature.

It is another object to provide a novel device which can be used repeatedly for detecting fires.

It is another object to provide a novel fire-detecting device having a substantially uniform construction lengthwise thereof.

A further object is to provide a device of a cablelike construction which is effective continuously throughout its length for detecting high temperatures as for fire-alarm systems, control apparatus or the like.

Other objects and features of my invention will more fully appear from the following description and the appended claims.

In the description of my invention reference is had to the accompanying drawings, of which:

Figure 1 is a view of a control and/or indicating system including a detecting cable, partly broken away, according to my invention; and Figure 2 is a fractional view, partly in section, of an end portion of this cable.

In the preferred embodiment of my invention shown in the accompanying figures I employ a detecting apparatus in the form of a coaxial cable 1. This cable comprises a metal tube 2, preferably cylindrical, and a central conductor 3 which is centered at intervals by disks 4 of a refractory material such as glass. The space between the conductor 3 and tube 2 is substantially filled with a thermally-responsive electron-emitting material 5 comprising, for example, a mixture of alkaline-earth oxides such as barium and strontium oxides. The metal tube 2 may be sealed at the ends and be substantially evacuated, the sealing being effected by an appropriate "Kovar" glass bead 6 through which extends a terminal or portion of the conductor 3; however, my invention does not necessarily require that the tube be evacuated.

In using the cable 1 above described a potential is applied between the conductor 3 and tube 2. This potential may be either from an A.-C. or a D.-C. source, but preferably a D.-C. source is employed as from a battery 7 through a circuit 8. This source is preferably connected so that the tube 2 is negative and the conductor 3 positive for then the oxides 5 will be more nearly held to the negative potential in view of their greater area of contact with the tube; also, when the tube 2 is connected to the negative side of the battery it need not normally be insulated from ground. When any portion of the cable 1 is brought near a flame or other source of high temperature, the oxides in that portion of the cable are heated and emit electrons. These electrons are attracted to the positive element—i. e., the conductor 3—the same as in an electronic tube, and produce a current flow in the circuit 8. In this circuit is connected a control, indicating or alarm apparatus generally referred to as 9. Purely by way of example, this apparatus is shown as an indicator having a pointer 10 such as a D.-C. meter. Thus, when any portion of the cable is heated the pointer is deflected to give an indication remote from the cable. Alternatively, in alarm systems, the apparatus 9 would typically comprise a relay and associated alarm apparatus; however, such apparatus is standard and need not be herein described.

My invention particularly provides an effective and economical detecting apparatus for fire-alarm systems—especially for systems for detecting engine oil fires on aircraft—which will withstand high temperatures and repeated use. In detecting engine oil fires on aircraft, the cable 1 is typically shaped in the form of a circular loop and mounted on the fire wall behind the engine. Preferably, the cable is made relatively flexible— i. e., by using a relatively thin-walled tube 2 and loosely filling the tube with electron-emitting material 5—so that it can be bent into desired shapes, but alternatively the cable may be made relatively rigid and be then preformed to its desired shape.

I have herein shown and described a preferred embodiment of my invention, but this embodiment will be understood to be illustrative and not limitative of my invention as the same is subject to changes and modifications without departure from the scope of my invention, which I endeavor to express according to the following claims.

I claim:

1. A current-controlling apparatus responsive to high ambient temperatures comprising a pair of conductors having the space therebetween substantially evacuated, one of said conductors being closely thermally associated with the outside ambient, and a temperature-responsive electron-emitting material in said space and closely thermally associated with said one conductor.

2. A current-controlling device responsive to high ambient temperatures comprising a metal tube sealed at its ends and substantially evacuated of air, a central conductor in said tube insulated therefrom and extending lengthwise thereof, and a temperature-responsive electron-emitting material in said tube and in electrically-conductive contact with the inner wall surface thereof.

ROBERT H. POSTAL.

REFERENCES CITED

The following references are of record in the file of this patent:

UNITED STATES PATENTS

| Number | Name | Date |
| --- | --- | --- |
| 1,553,789 | Moeller | Sept. 15, 1925 |
| 1,626,931 | Grondahl | May 3, 1927 |
| 2,021,491 | Ruben | Nov. 19, 1935 |
| 2,057,383 | Kroger | Oct. 16, 1936 |
| 2,106,249 | Hower | Jan. 25, 1938 |
| 2,271,975 | Hall | Feb. 3, 1942 |
| 2,316,872 | Kernen | Apr. 20, 1943 |